(12) United States Patent
Ikeda et al.

(10) Patent No.: US 12,515,699 B2
(45) Date of Patent: Jan. 6, 2026

(54) CONTROL DEVICE

(71) Applicant: TOYOTA JIDOSHA KABUSHIKI KAISHA, Toyota (JP)

(72) Inventors: Keigo Ikeda, Nisshin (JP); Yasuhiro Saito, Toyoake (JP); Daiki Yokoyama, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 77 days.

(21) Appl. No.: 18/673,583

(22) Filed: May 24, 2024

(65) Prior Publication Data

US 2024/0400092 A1 Dec. 5, 2024

(30) Foreign Application Priority Data

May 31, 2023 (JP) .................................. 2023-089445
Oct. 23, 2023 (JP) .................................. 2023-181556

(51) Int. Cl.
*B60W 50/00* (2006.01)
*B60W 60/00* (2020.01)
*G01C 21/30* (2006.01)

(52) U.S. Cl.
CPC ........... *B60W 60/001* (2020.02); *G01C 21/30* (2013.01); *B60W 2554/80* (2020.02)

(58) Field of Classification Search
CPC .. B60W 60/001; B60W 2554/80; G01C 21/30
See application file for complete search history.

(56) References Cited

U.S. PATENT DOCUMENTS

| | | | |
|---|---|---|---|
| 10,304,237 B2 * | 5/2019 | Sequeira | G06T 15/10 |
| 2017/0320529 A1 | 11/2017 | Nordbruch | |
| 2019/0295266 A1 * | 9/2019 | Fan | G06T 7/37 |
| 2021/0394747 A1 | 12/2021 | Li | |

FOREIGN PATENT DOCUMENTS

| | | |
|---|---|---|
| JP | 2017-538619 A | 12/2017 |
| JP | 2022-515809 A | 2/2022 |
| JP | 2022-112077 A | 8/2022 |

* cited by examiner

*Primary Examiner* — Aryan E Weisenfeld
(74) *Attorney, Agent, or Firm* — Sughrue Mion, PLLC

(57) ABSTRACT

The present disclosure provides a control device that generates a control command for controlling a mobile body by using three-dimensional point cloud data of the mobile body measured by a distance measurement device. The control device includes an estimation unit configured to, in a case where a defective portion is generated in the three-dimensional point cloud data acquired from the distance measurement device, execute matching between a substantial point cloud portion obtained by excluding a defect corresponding portion corresponding to the defective portion from a template point cloud and the three-dimensional point cloud data, to estimate at least one of a position and an orientation of the mobile body.

5 Claims, 6 Drawing Sheets

FIG. 4
<CASE WHERE DEFECT DOES NOT EXIST IN POINT CLOUD>
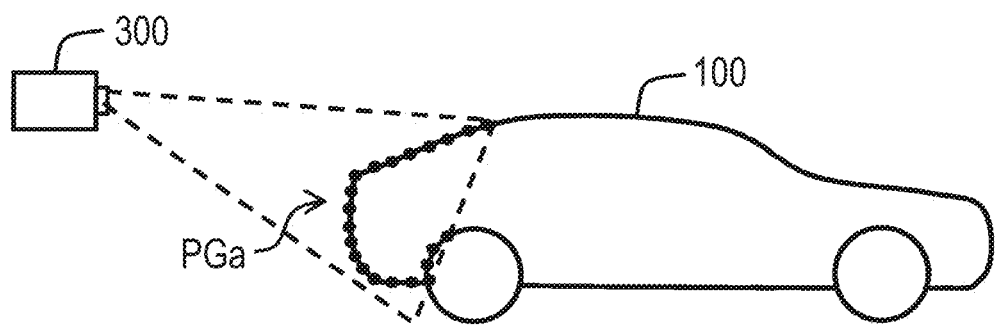
<CASE WHERE DEFECT EXISTS IN POINT CLOUD>
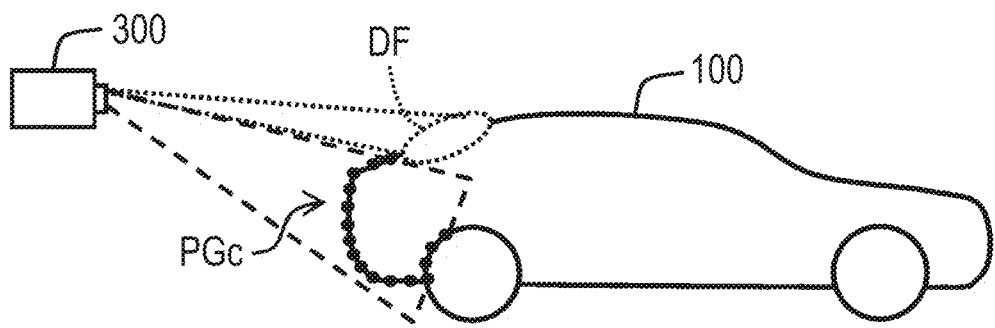

CONTROL DEVICE

CROSS-REFERENCE TO RELATED APPLICATION

This application claims priority to Japanese Patent Application No. 2023-089445 filed on May 31, 2023, and Japanese Patent Application No. 2023-181556 filed on Oct. 23, 2023, each incorporated herein by reference in its entirety.

BACKGROUND

1. Technical Field

The present disclosure relates to a control device for a mobile body.

2. Description of Related Art

A technique of autonomously transporting a vehicle in a vehicle manufacturing process is known (for example, Japanese Unexamined Patent Application Publication (Translation of PCT Application) No. 2017-538619 (JP 2017-538619 A)).

SUMMARY

When a mobile body, a vehicle, is moved by autonomous transport, processing of estimating a position or an orientation of the mobile body is executed. The position or the orientation of the mobile body can be estimated by using three-dimensional point cloud data acquired by a distance measurement device, such as a camera or a radar. However, in a case where a blind spot is generated in the distance measurement device, when the three-dimensional point cloud data is directly used to execute the estimation processing, there is a possibility that a correct estimation result cannot be obtained.

The present disclosure can be implemented as the following aspects.

A first aspect of the present disclosure relates to a control device that generates a control command for controlling a mobile body by using three-dimensional point cloud data of the mobile body measured by a distance measurement device. The control device includes an estimation unit. The estimation unit is configured to, in a case where a defective portion is generated in the three-dimensional point cloud data acquired from the distance measurement device, execute matching between a substantial point cloud portion obtained by excluding a defect corresponding portion corresponding to the defective portion from a template point cloud and the three-dimensional point cloud data, to estimate at least one of a position and an orientation of the mobile body.

According to the aspect, even in a case where the defective portion is generated in the three-dimensional point cloud data, at least one of the position and the orientation of the mobile body can be correctly estimated.

In the aspect of the present disclosure, the control device may further include a template point cloud modification unit configured to delete the defect corresponding portion from the template point cloud, to create a modified template point cloud. The estimation unit may be configured to execute matching between the three-dimensional point cloud data and the modified template point cloud, to estimate at least one of the position and the orientation of the mobile body.

According to the aspect, since the modified template point cloud is used, the processing speed of the estimation can be increased.

In the aspect of the present disclosure, the control device may further include a defect specifying unit configured to specify the defective portion of the three-dimensional point cloud data.

According to the aspect, the defect corresponding portion can be excluded from the template point cloud after the defective portion is specified.

In the aspect of the present disclosure, in the control device, the defect specifying unit may be configured to specify the defective portion of the three-dimensional point cloud data acquired from the distance measurement device, with reference to a history of the three-dimensional point cloud data.

According to the aspect, the defective portion can be correctly specified.

In the aspect of the present disclosure, in the control device, the defect specifying unit may be configured to specify the defective portion depending on a distance between the mobile body and the distance measurement device by using a map in which the defective portion depending on the distance between the mobile body and the distance measurement device is registered.

According to the aspect, the defective portion can be easily specified.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 4 is a diagram illustrating an example of a defective portion of three-dimensional point cloud data;

DETAILED DESCRIPTION OF EMBODIMENTS

A. First Embodiment

Figure 1:
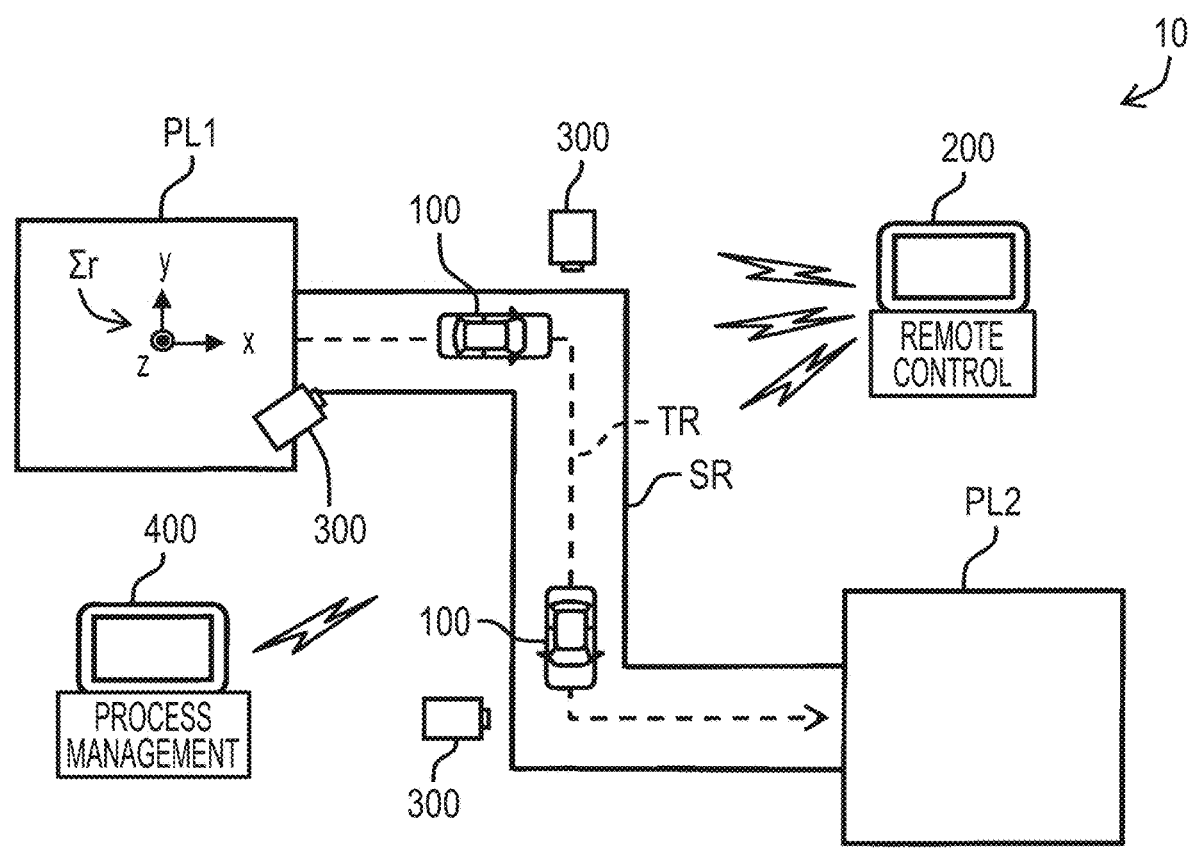
FIG. 1 is a conceptual diagram illustrating a configuration of a remote control system according to an embodiment.

FIG. 1 is a conceptual diagram illustrating a configuration of a remote control system 10 according to an embodiment. The remote control system 10 includes one or more vehicles 100 as a mobile body, a remote control device 200 that generates a control command for remotely controlling the vehicle 100 and transmits the control command to the vehicle 100, a plurality of distance measurement devices 300 that measures three-dimensional point cloud data of the vehicle 100, and a process management device 400 that manages a manufacturing process of the vehicle 100. In the first embodiment, the remote control device 200 corresponds to a "control device" according to the present disclosure.

The vehicle 100 is preferably a battery electric vehicle (BEV). The mobile body is not limited to the battery electric vehicle, and may be, for example, a gasoline vehicle, a hybrid electric vehicle, or a fuel cell electric vehicle. The mobile body is not limited to the vehicle 100, and may be, for example, an electric vertical take-off and landing (so-called flying car). Any position in a factory is represented by xyz coordinate values in a reference coordinate system Σr.

In the present disclosure, the "mobile body" means a movable object. The vehicle may be a vehicle that travels by wheels or a vehicle that travels using a caterpillar, and is, for example, a passenger car, a truck, a bus, a two-wheeled vehicle, a four-wheeled vehicle, a tank, and a construction vehicle. In addition, in a case where the mobile body is other than the vehicle, the expression of "vehicle" and "car" in the present disclosure can be replaced with "mobile body" as appropriate, and the expression of "travel" can be replaced with "move" as appropriate.

The vehicle 100 is configured to travel via the unmanned driving. The "unmanned driving" means driving that does not depend on a traveling operation of an occupant. The traveling operation means an operation related to at least any one of "traveling", "turning", and "stopping" of the vehicle 100. The unmanned driving is implemented by automatic or manual remote control using a device located outside the vehicle 100 or by autonomous control for the vehicle 100. The occupant who does not perform the traveling operation may get in the vehicle 100 that travels via the unmanned driving. Examples of the occupant who does not perform the traveling operation include a person who simply sits on a seat of the vehicle 100 and a person who executes work different from the traveling operation, such as assembly, inspection, or operation of switches, in a state of getting in the vehicle 100. The driving via the traveling operation of the occupant may be referred to as "manned driving".

In the present specification, the "remote control" includes "complete remote control" in which all the operations of the vehicle 100 are completely decided from the outside of the vehicle 100, and "partial remote control" in which a part of the operations of the vehicle 100 is decided from the outside of the vehicle 100. In addition, the "autonomous control" includes "complete autonomous control" in which the vehicle 100 autonomously controls the operation thereof without receiving any information from the external device of the vehicle 100, and "partial autonomous control" in which the vehicle 100 autonomously controls the operation thereof by using the information received from the external device of the vehicle 100.

In the present embodiment, the remote control of the vehicle 100 is executed in a factory that manufactures the vehicle 100. The factory includes a first place PL1 and a second place PL2. The first place PL1 is, for example, a place where the vehicle 100 is assembled, and the second place PL2 is, for example, a place where the vehicle 100 is inspected. The first place PL1 and the second place PL2 are connected via the travel road SR on which the vehicle 100 can travel.

The distance measurement devices 300 that use individual vehicles 100 as measurement targets are installed around the travel road SR. The remote control device 200 can acquire relative position and orientation of the vehicle 100 with respect to a target route TR in real time by using the three-dimensional point cloud data measured by each distance measurement device 300. As the distance measurement device 300, a camera or a light detection and ranging (LiDAR) can be used. In particular, the LiDAR is preferable because highly accurate three-dimensional point cloud data can be obtained. The position of each distance measurement device 300 is fixed, and a relative relationship between the reference coordinate system Σr and a device coordinate system of each distance measurement device 300 is known. A coordinate transformation matrix for mutually transforming a coordinate value in the reference coordinate system Σr and a coordinate value in the device coordinate system of each distance measurement device 300 is stored in the remote control device 200 in advance.

When the three-dimensional point cloud data of the vehicle 100 as a control target is measured by the distance measurement device 300, a blind spot may be generated in a range of a field of view of the distance measurement device 300 depending on a positional relationship between the distance measurement device 300 and the vehicle as the control target, or a positional relationship between the vehicle as the control target and another vehicle. In a case where such a blind spot exists, a defective portion is generated in the three-dimensional point cloud data, and there is a possibility that the position and the orientation of the vehicle as the control target cannot be correctly estimated. As will be described below, in the present disclosure, even in a case where the defective portion is generated in the three-dimensional point cloud data, the position and the orientation of the vehicle 100 can be correctly estimated.

The remote control device 200 generates a control command for causing the vehicle 100 to travel along the target route TR, and transmits the control command to the vehicle 100. The vehicle 100 travels in response to the received control command. Therefore, the remote control system 10 can move the vehicle 100 from the first place PL1 to the second place PL2 by the remote control without using a transport device, such as a crane or a conveyor.

Figure 2:
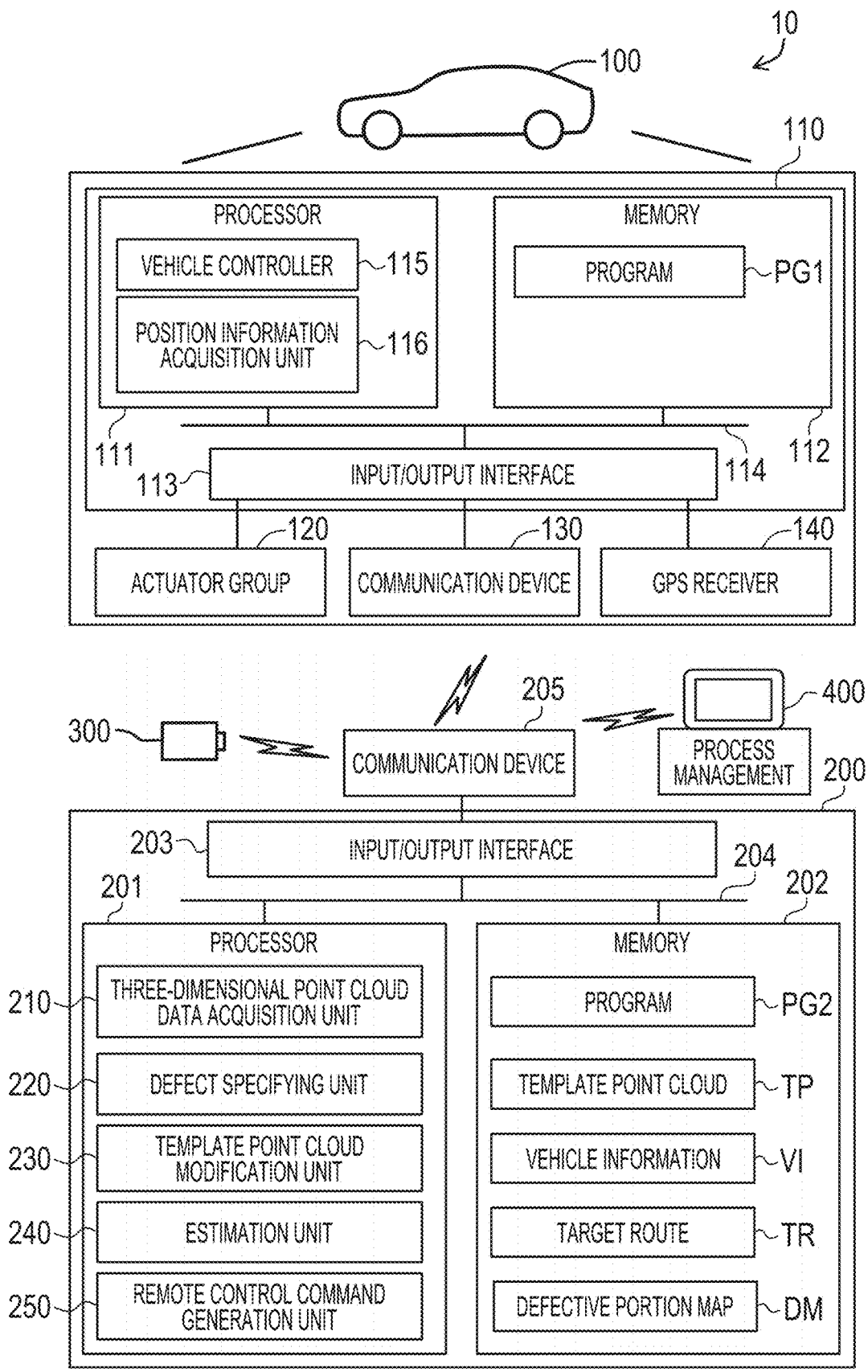
FIG. 2 is a block diagram illustrating a configuration of a vehicle and a remote control device according to a first embodiment.

FIG. 2 is a block diagram illustrating a configuration of the vehicle 100 and the remote control device 200. The vehicle 100 includes a vehicle control device 110 that controls each unit of the vehicle 100, an actuator group 120 that is driven under control of the vehicle control device 110, a communication device 130 that communicates with the remote control device 200 via wireless communication, and a GPS receiver 140 that acquires position information of the vehicle 100. In the present embodiment, the actuator group 120 includes an actuator of a drive device for accelerating the vehicle 100, an actuator of a steering device for changing a traveling direction of the vehicle 100, and an actuator of a braking device for decelerating the vehicle 100. The drive device includes a battery, a traveling motor driven by power of the battery, and drive wheels rotated by the traveling motor. The actuator of the drive device includes the traveling motor. The actuator group 120 may further include an actuator for rocking a windshield wiper of the vehicle 100 or an actuator for opening and closing an electric window of the vehicle 100.

The vehicle control device 110 is configured by a computer including a processor 111, a memory 112, an input/output interface 113, and an internal bus 114. The processor 111, the memory 112, and the input/output interface 113 are connected to be bidirectionally communicable with each other via the internal bus 114. The actuator group 120, the communication device 130, and the GPS receiver 140 are connected to the input/output interface 113.

In the present embodiment, the processor 111 functions as a vehicle controller 115 and a position information acquisition unit 116 by executing a program PG1 stored in the memory 112 in advance. The vehicle controller 115 controls the actuator group 120. The vehicle controller 115 can cause the vehicle 100 to travel by controlling the actuator group 120 in response to an operation of a driver in a case where the driver gets in the vehicle 100. The vehicle controller 115 can also cause the vehicle 100 to travel by controlling the actuator group 120 in response to the control command transmitted from the remote control device 200 regardless of whether or not the driver gets in the vehicle 100. The position information acquisition unit 116 acquires position information indicating a current position of the vehicle 100 by using the GPS receiver 140. Note that the position information acquisition unit 116 and the GPS receiver 140 are not always needed.

The remote control device 200 is configured by a computer including a processor 201, a memory 202, an input/output interface 203, and an internal bus 204. The processor 201, the memory 202, and the input/output interface 203 are connected to be bidirectionally communicable with each other via the internal bus 204. A communication device 205 for communicating with the vehicle 100, the distance measurement device 300, and the process management device 400 via wireless communication is connected to the input/output interface 203.

In the present embodiment, the processor 201 functions as a three-dimensional point cloud data acquisition unit 210, a defect specifying unit 220, a template point cloud modification unit 230, an estimation unit 240, and a remote control command generation unit 250 by executing a program PG2 stored in the memory 202 in advance.

The three-dimensional point cloud data acquisition unit 210 acquires the three-dimensional point cloud data measured by the distance measurement device 300 for the vehicle 100 as the control target. The three-dimensional point cloud data is data indicating the three-dimensional positions of the point cloud detected by the distance measurement device 300.

The defect specifying unit 220 specifies the defective portion in the three-dimensional point cloud data. This specifying method will be described below.

The template point cloud modification unit 230 deletes a defect corresponding portion corresponding to the defective portion from a template point cloud TP, to create the modified template point cloud. The template point cloud TP is stored in the memory 202 in advance.

The estimation unit 240 executes matching between the three-dimensional point cloud data of the vehicle 100 as the control target and the modified template point cloud, to estimate the position and the orientation of the vehicle 100. In a case where the three-dimensional point cloud data is not available, the estimation unit 240 can estimate the position and the orientation of the vehicle 100 by using a traveling history of the vehicle 100 or the position information detected by the GPS receiver 140 mounted on the vehicle 100. The estimation unit 240 may estimate solely one of the position and the orientation of the vehicle 100. In this case, the other of the position and the orientation of the vehicle 100 is decided by using the traveling history of the vehicle 100 and the like.

The position and the orientation of the vehicle are also referred to as "vehicle position information". In the present embodiment, the position and the orientation of the vehicle 100 in the reference coordinate system of the factory are included in the vehicle position information.

The remote control command generation unit 250 generates the control command for the remote control by using the estimated position and orientation of the vehicle 100, and transmits the generated control command to the vehicle 100. The control command is a command for causing the vehicle 100 to travel along the target route TR stored in the memory 202. The control command can be generated as a command including a driving force or a braking force, and the steering angle. Alternatively, the control command may be generated as a command including at least one of the position and the orientation of the vehicle 100 and a future traveling route.

In the present embodiment, the control command includes the acceleration and the steering angle of the vehicle 100 as the parameters. In other embodiments, the control command may include the speed of the vehicle 100 as the parameter instead of or in addition to the acceleration of the vehicle 100.

The process management device 400 executes the management of the entire manufacturing process of the vehicle 100 in the factory. For example, when one vehicle 100 starts traveling along the target route TR, the individual information indicating an identification number or a model of the vehicle 100 is transmitted from the process management device 400 to the remote control device 200. The position of the vehicle 100 detected by the remote control device 200 is also transmitted to the process management device 400. In addition, the function of the process management device 400 may be implemented in the same device as the remote control device 200.

The remote control device 200 is also referred to as a "server", and the distance measurement device 300 is also referred to as an "external sensor". The control command is also referred to as a "traveling control signal", the target route TR is also referred to as a "reference route", and the reference coordinate system is also referred to as a "global coordinate system"

Figure 3:
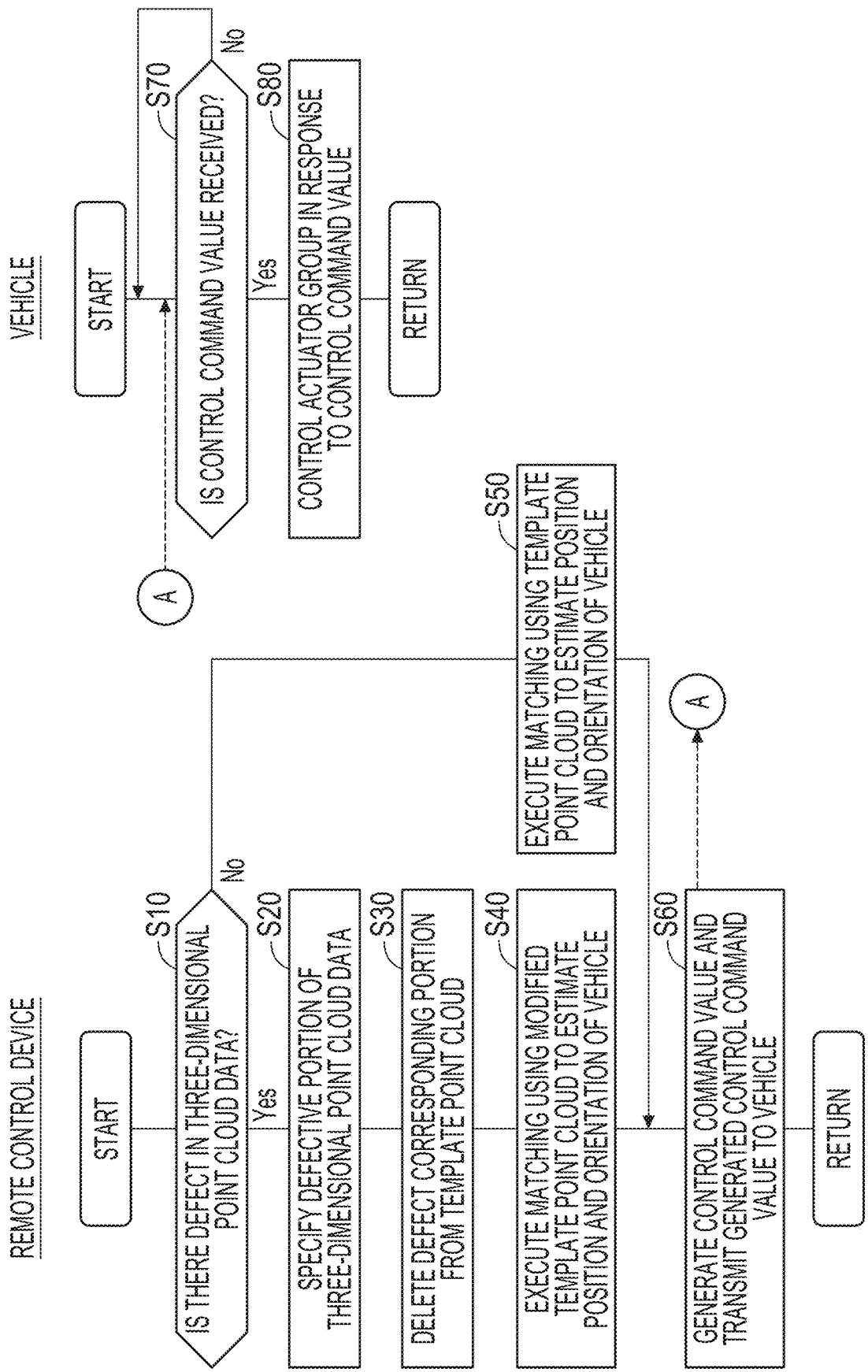
FIG. 3 is a flowchart illustrating a processing procedure of remote control according to the first embodiment.

FIG. 3 is a flowchart illustrating a processing procedure of the remote control according to the first embodiment. The processing of the remote control device 200 is executed at a constant cycle. Alternatively, the three-dimensional point cloud data acquisition unit 210 may execute the processing of the remote control device 200 illustrated in FIG. 3 each time the three-dimensional point cloud data is newly acquired from the distance measurement device 300 that is in charge of the measurement of the vehicle 100 as the control target. The three-dimensional point cloud data acquisition unit 210 may execute preprocessing of removing background point cloud data indicating a stationary object from the newly acquired three-dimensional point cloud data.

In step S10, the defect specifying unit 220 determines whether or not the defective portion exists in the three-dimensional point cloud data.

FIG. 4 is a diagram illustrating an example of the defective portion of the three-dimensional point cloud data. An upper portion of FIG. 4 illustrates three-dimensional point cloud data PGa in which the defective portion does not exist, and a lower portion of FIG. 4 illustrates three-dimensional point cloud data PGc in which a defective portion DF exists. The defective portion DF may be generated by the fact that the field of view of the distance measurement device 300 is partially shielded by another vehicle or a stationary object.

As a determination method of the existence of the defective portion DF in step S10, for example, any of the following methods can be used.

Determination Method A1 for Existence of Defective Portion

In a distribution of the point cloud in the three-dimensional point cloud data, a size of a portion in which a density of the point cloud is equal to or less than a density reference value is obtained, and a determination is made that the defective portion DF exists in a case where the size is equal to or larger than a size threshold value. In addition, the "density reference value" may be zero.

Determination Method A2 for Existence of Defective Portion

A bounding box that surrounds a portion in which the point cloud is dense is decided in the three-dimensional point cloud data, a size of a portion in which a density of the point cloud is equal to or less than the density reference value in the bounding box is obtained, and a determination is made that the defective portion DF exists in a case where the size is equal to or larger than the size threshold value.

Determination Method A3 for Existence of Defective Portion

A determination is made whether or not the defective portion DF exists depending on a distance between the vehicle 100 and the distance measurement device 300. As the distance between the vehicle 100 and the distance measurement device 300, a distance to a reference position of the bounding box that surrounds the portion in which the point cloud is dense can be used. In a case where the traveling environment of the vehicle 100 is almost constant, the defective portion DF due to the stationary object is generated at a constant place depending on the distance between the vehicle 100 and the distance measurement device 300, so that whether or not the defective portion DF exists depending on the distance can be decided in advance.

In the determination methods A1, A2, the processing of obtaining the size of the portion in which the density of the point cloud is equal to or less than the density reference value may be executed solely for the portion in which the point cloud of the vehicle 100 is estimated to exist. The position of the portion in which the point cloud of the vehicle 100 is estimated to exist is decided depending on the model of the vehicle 100, and is stored as vehicle information VI for each type. In the determination method A2, the bounding box may be divided into a plurality of voxels (micro boxes) to calculate the density of the point cloud for each voxel, and in a case where a size of a portion in which the voxels having the density of the point cloud equal to or less than the density reference value is clustered is equal to or larger than the size threshold value, a determination may be made that the defective portion DF exists.

In a case where the defective portion DF does not exist, the processing proceeds to step S50, and the estimation unit 240 executes matching between the template point cloud TP and the three-dimensional point cloud data, to estimate the position and the orientation of the vehicle 100.

On the other hand, in a case where the defective portion DF exists, the processing proceeds from step S10 to step S20, and the defect specifying unit 220 specifies the defective portion DF of the three-dimensional point cloud data. As the specifying method of the defective portion DF, for example, any of the following methods can be used.

Specifying Method B1 of Defective Portion

In a case where the determination is made by the determination method A1 or A2 that the defective portion DF exists, a portion in which the point cloud is continuous with the density equal to or less than the density reference value is specified as the defective portion DF. In this case, the defective portion may be specified as a cluster of voxels.

Specifying Method B2 of Defective Portion

The defective portion DF of the three-dimensional point cloud data PGc of this time is specified with reference to a history of the three-dimensional point cloud data on the same vehicle as the control target. For example, by executing matching between representative three-dimensional point cloud data of the history of the three-dimensional point cloud data and the three-dimensional point cloud data PGc of this time, a portion that does not exist in the three-dimensional point cloud data PGc of this time can be specified as the defective portion DF. As the "representative three-dimensional point cloud data", the most recent one three-dimensional point cloud data or data at the present time estimated from the most recent several three-dimensional point cloud data can be used. In addition, in order to increase the processing speed of the matching, preprocessing of thinning out the point cloud may be executed for two three-dimensional point cloud data as matching target.

Specifying Method B3 of Defective Portion

In a case where the determination is made by the determination method A3 that the defective portion DF exists, the defective portion DF is specified depending on the distance between the vehicle 100 and the distance measurement device 300 by using a defective portion map DM in which the defective portion DF registered depending on the distance between the vehicle 100 and the distance measurement device 300. The defective portion map DM is registered in the memory 202 in advance. In a case where the traveling environment of the vehicle 100 is almost constant, the defective portion DF due to the stationary object is generated at a constant place depending on the distance between the vehicle 100 and the distance measurement device 300, so that the defective portion map DM can be created in advance and registered.

In step S30, the template point cloud modification unit 230 deletes a portion corresponding to the defective portion DF from the template point cloud TP, to create the modified template point cloud. The modified template point cloud is template data representing a substantial point cloud portion obtained by excluding the defect corresponding portion corresponding to the defective portion DF from the template point cloud TP. In step S40, the estimation unit 240 executes matching between the modified template point cloud and the three-dimensional point cloud data, to estimate the position and the orientation of the vehicle 100.

Instead of creating the modified template point cloud, the estimation processing in step S40 may be executed by excluding the defect corresponding portion corresponding to the defective portion DF from the template point cloud TP. In this case, in the template point cloud TP, the points included in the defect corresponding portion are excluded from the estimation processing routine. This processing is the same as the processing of steps S30, S40 in terms of the matching between the substantial point cloud portion obtained by excluding the defect corresponding portion corresponding to the defective portion DF from the template point cloud TP and the three-dimensional point cloud data. Note that, in a case where the modified template point cloud is created and the matching is executed, the processing speed of the estimation can be increased.

In step S60, the remote control command generation unit 250 generates a control command value by using the position and the orientation of the vehicle 100 estimated in step S40 or S50, and transmits the generated control command value to the vehicle 100. The details of step S60 are as follows.

In step S60, the remote control command generation unit 250 first decides the target position to which the vehicle 100 should head next, by using the vehicle position information including the position and the orientation of the vehicle 100 and the target route TR. The remote control command generation unit 250 decides the target position on the target route TR that is ahead of the current position of the vehicle 100, and generates the control command value for causing the vehicle 100 to travel toward the target position. In the present embodiment, the control command value includes the acceleration and the steering angle of the vehicle 100 as the parameters. The remote control command generation unit 250 calculates a traveling speed of the vehicle 100 from the transition of the position of the vehicle 100, and compares the calculated traveling speed with a target speed. As a whole, the remote control command generation unit 250 decides the acceleration such that the vehicle 100 is accelerated when the traveling speed is lower than the target speed, and decides the acceleration such that the vehicle 100 is decelerated when the traveling speed is higher than the target speed. The remote control command generation unit 250 decides the steering angle and the acceleration such that the vehicle 100 does not deviate from the target route TR in a case where the vehicle 100 is located on the target route TR, and decides the steering angle and the acceleration such that the vehicle 100 returns to the target route TR in a case where the vehicle 100 is not located on the target route TR, in other words, in a case where the vehicle 100 deviates from the target route TR. In other embodiments, the control command value may include the speed of the vehicle 100 as the parameter instead of or in addition to the acceleration of the vehicle 100. The generated control command value is transmitted from the remote control device 200 to the vehicle 100.

The control processing via the processor 111 of the vehicle 100 includes step S70 and step S80. In step S70, the vehicle controller 115 waits until the control command value is acquired from the remote control device 200. When the control command value is acquired, the processing proceeds to step S80, and the vehicle controller 115 controls the actuator group 120 in response to the acquired control command value. With the remote control system 10 according to the present embodiment, the vehicle 100 can be caused to travel via the remote control, and the vehicle 100 can be moved along the target route TR without using transport equipment, such as a crane or a conveyor.

As described above, in the first embodiment, since the template matching is executed by excluding the defect corresponding portion corresponding to the defective portion of the three-dimensional point cloud data from the template point cloud, even in a case where the defective portion is generated in the three-dimensional point cloud data, at least one of the position and the orientation of the vehicle 100 can be correctly estimated. In addition, with the processing procedure of FIG. 3, the defect specifying unit 220 updates the defective portion in response to the movement of the vehicle 100, so that the defective portion can be updated to an appropriate state.

In the above-described embodiment, the vehicle 100 may have a configuration that can be moved by the remote control, and may be a configuration of a platform including a configuration described below, for example. Specifically, the vehicle 100 may include at least the vehicle controller 115 and the communication device 150 in order to exhibit three functions of "traveling", "turning", and "stopping" by the remote control. That is, the vehicle 100 that can be moved by the remote control need not be equipped with at least a part of the interior components, such as a driver's seat and a dashboard, need not be equipped with at least a part of the exterior components, such as a bumper and a fender mirror, and need not be equipped with a bodyshell. In this case, the remaining components, such as the bodyshell, may be equipped on the vehicle 100 while the vehicle 100 is shipped from the factory, or the remaining components, such as the bodyshell, may be equipped on the vehicle 100 after the vehicle 100 is shipped from the factory in a state where the remaining components, such as the bodyshell, are not equipped on the vehicle 100. The position decision can be made for the form of the platform in the same manner as the vehicle 100 in each of the above-described embodiments.

B. Second Embodiment

Figure 5:
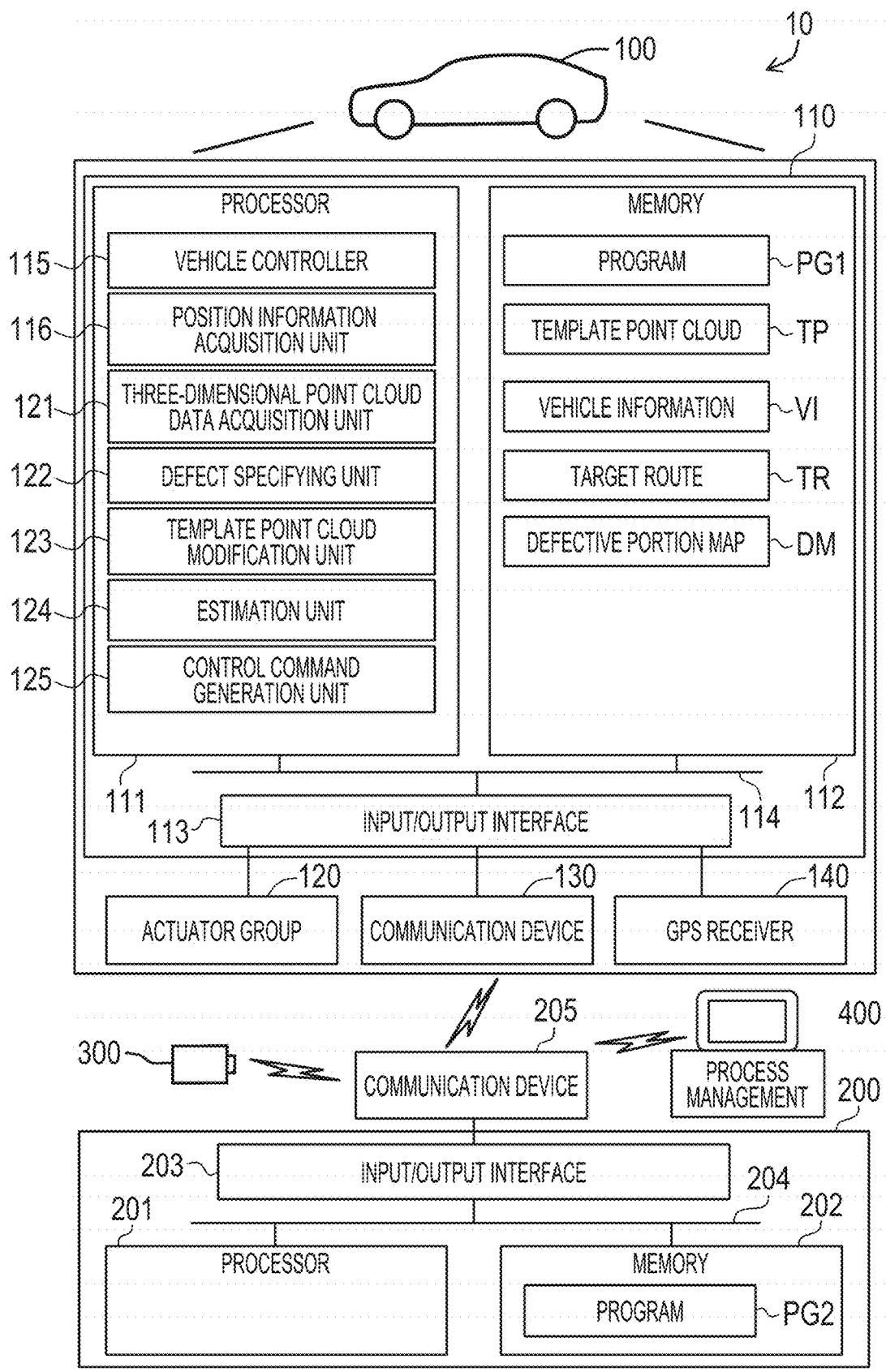
FIG. 5 is a block diagram illustrating a configuration of a vehicle and a remote control device according to a second embodiment.

FIG. 5 is a block diagram illustrating a configuration of a vehicle 100 and a remote control device 200 according to a second embodiment. The differences from the configuration of the first embodiment illustrated in FIG. 2 are mainly the following three points.

(1) The functions of a three-dimensional point cloud data acquisition unit 121, a defect specifying unit 122, a template point cloud modification unit 123, an estimation unit 124, and a control command generation unit 125 are added to the functions of the processor 111 of the vehicle 100.

(2) The template point cloud TP, the vehicle information VI, the target route TR, and the defective portion map DM are stored in the memory 112 of the vehicle 100.

(3) The functions of the three-dimensional point cloud data acquisition unit 210, the defect specifying unit 220, the template point cloud modification unit 230, the estimation unit 240, and the remote control command generation unit 250 are omitted from the functions of the processor 201 of the remote control device 200.

Since the functions of the three-dimensional point cloud data acquisition unit 121, the defect specifying unit 122, the template point cloud modification unit 123, the estimation unit 124, and the control command generation unit 125 are substantially the same as the functions of the three-dimensional point cloud data acquisition unit 210, the defect specifying unit 220, the template point cloud modification unit 230, the estimation unit 240, and the remote control command generation unit 250, the description thereof will be omitted.

In the second embodiment, the vehicle 100 executes the processing of executing the template matching by excluding the defect corresponding portion corresponding to the defective portion of the three-dimensional point cloud data from the template point cloud, to estimate at least one of the position and the orientation of the vehicle 100. That is, in the second embodiment, the vehicle control device 110 of the vehicle 100 corresponds to a "control device" according to the present disclosure.

Figure 6:
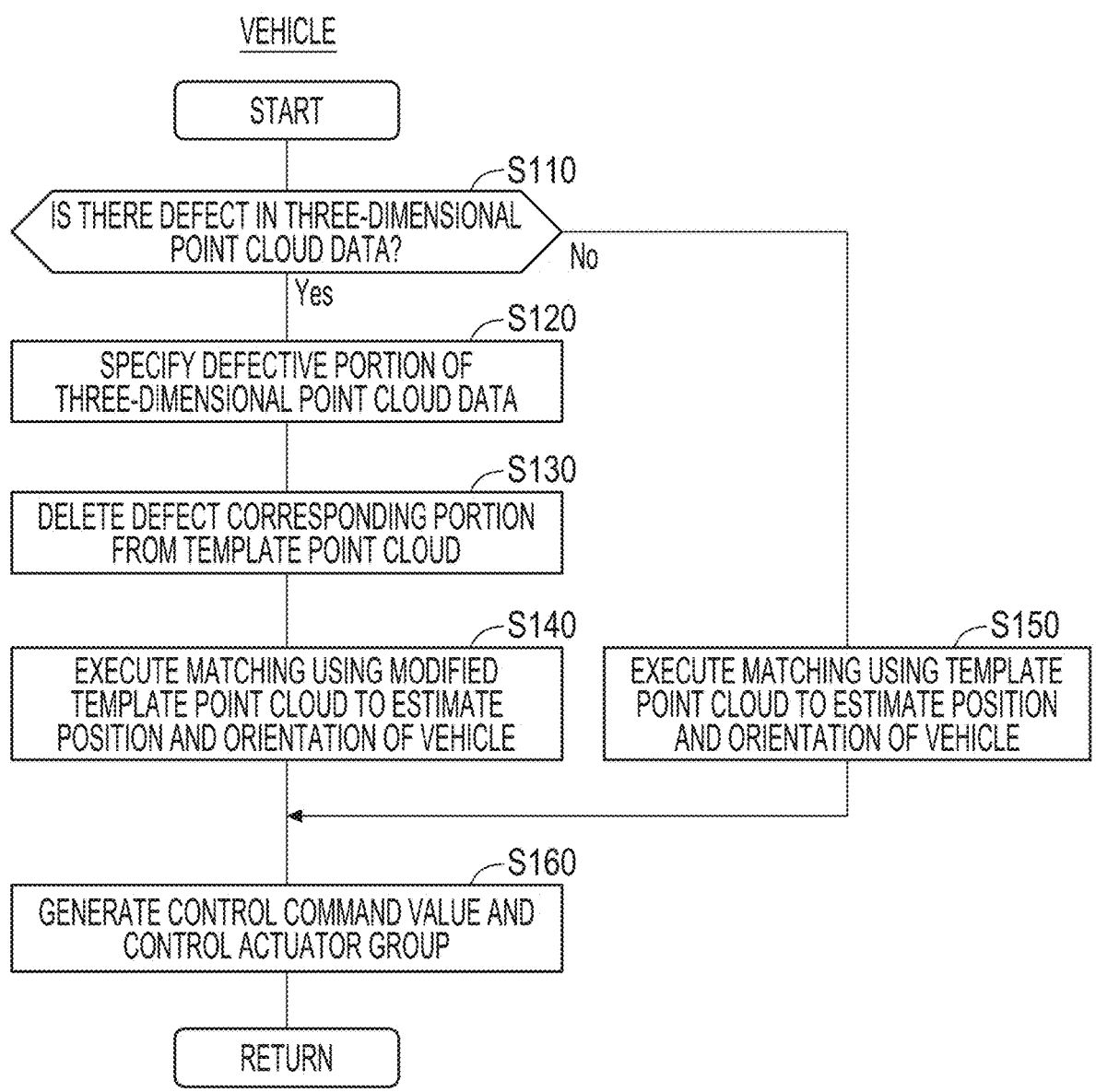
FIG. 6 is a flowchart illustrating a processing procedure of vehicle control according to the second embodiment.

FIG. 6 is a flowchart illustrating a processing procedure of vehicle control according to the second embodiment. Steps S110 to S160 of FIG. 6 respectively correspond to steps S10 to S60 of the first embodiment illustrated in FIG. 3. Note that, in step S160, the control command value is created by the control command generation unit 125 of the vehicle 100, so that the control of the actuator group 120 of the vehicle 100 is executed without transmitting and receiving the control command value between the remote control device 200 and the vehicle 100.

The template point cloud TP, the vehicle information VI, the target route TR, and the defective portion map DM are stored in the memory 112 of the vehicle 100 before the vehicle 100 starts the traveling along the target route TR. These pieces of data may be supplied from the remote control device 200 or the process management device 400, or may be written in the memory 112 of the vehicle 100 by using another means.

As described above, also in the second embodiment, as in the first embodiment, the template matching is executed by excluding the defect corresponding portion corresponding to the defective portion of the three-dimensional point cloud data from the template point cloud, even in a case where the defective portion is generated in the three-dimensional point cloud data, at least one of the position and the orientation of the vehicle 100 can be correctly estimated.

C. Other Embodiment

In various above-described embodiments, the "server 200" means the remote control device 200, and the "external sensor" means the distance measurement device 300. In addition, the "traveling control signal" means the control command, the "reference route" means the target route TR, and the "global coordinate system" means the reference coordinate system $\Sigma r$.

(C1) In each of the above-described embodiments, the external sensor is a light detection and ranging (LiDAR). In contrast, the external sensor need not be the LiDAR, and may be, for example, a camera. In a case where the external sensor is the camera, for example, the server 200 detects an outer shape of the vehicle 100 from the captured image, calculates coordinates of a positioning point of the vehicle 100 in a captured image coordinate system, that is, a local coordinate system, and acquires the position of the vehicle 100 by transforming the calculated coordinates into the coordinates in the global coordinate system. The outer shape of the vehicle 100 included in the captured image can be detected, for example, by inputting the captured image to a detection model using artificial intelligence. The detection model is prepared, for example, inside the remote control system 10 or outside the remote control system 10, and is stored in advance in a memory of the server 200. Examples of the detection model include a trained machine learning model that has been trained to implement any of semantic segmentation and instance segmentation. As the machine learning model, for example, a convolutional neural network (CNN) that has been trained by supervised learning using a training data set can be used. The training data set has, for example, a plurality of training images including the vehicle 100 and a label indicating whether each area in the training image is an area indicating the vehicle 100 or an area indicating an area other than the vehicle 100. When the CNN is trained, parameters of the CNN are preferably updated by backpropagation (error backpropagation method) to reduce an error between the output result of the detection model and the label. The server 200 can acquire the orientation of the vehicle 100 by executing the estimation based on an orientation of a movement vector of the vehicle 100 calculated from a positional change of a feature point of the vehicle 100 between frames of the captured image by using, for example, an optical flow method.

(C2) In the first embodiment, the server 200 executes the processing from the acquisition of the vehicle position information including the position and the orientation of the vehicle 100 to the generation of the traveling control signal. In contrast, the vehicle 100 may execute at least a part of the processing from the acquisition of the vehicle position information to the generation of the traveling control signal. For example, the following forms (1) to (3) may be used.

(1) The server 200 may acquire the vehicle position information, decide the target position to which the vehicle 100 should head next, and generate the route from the current position of the vehicle 100 indicated by the acquired vehicle position information to the target position. The server 200 may generate a route to the target position between the current position and the destination, or may generate a route to the destination. The server 200 may transmit the generated route to the vehicle 100. The vehicle 100 may generate the traveling control signal for causing the vehicle 100 to travel on the route received from the server 200, and control the actuator of the vehicle 100 by using the generated traveling control signal.

(2) The server 200 may acquire the vehicle position information, and transmit the acquired vehicle position information to the vehicle 100. The vehicle 100 may decide the target position to which the vehicle 100 should head next, generate a route from the current position of the vehicle 100 represented by the received vehicle position information to the target position, generate a traveling control signal such that the vehicle 100 travels on the generated route, and control the actuator of the vehicle 100 by using the generated traveling control signal.

(3) In the above-described forms (1) and (2), an internal sensor may be mounted on the vehicle 100, and a detection result output from the internal sensor may be used for at least one of the generation of the route and the generation of the traveling control signal. The internal sensor is a sensor mounted on the vehicle 100. Specifically, the internal sensor may include, for example, a camera, a LiDAR, a millimeter wave radar, an ultrasound sensor, a GPS sensor, an acceleration sensor, and a gyro sensor. For example, in the above-described form (1), the server 200 may acquire the detection result of the internal sensor and reflect the detection result of the internal sensor in the route when generating the route. In the above-described form (1), the vehicle 100 may acquire the detection result of the internal sensor and reflect the detection result of the internal sensor to the traveling control signal when the traveling control signal is generated. In the above-described form (2), the vehicle 100 may acquire the detection result of the internal sensor and reflect the detection result of the internal sensor to the route when the route is generated. In the above-described form (2), the vehicle 100 may acquire the detection result of the internal sensor and reflect the detection result of the internal sensor to the traveling control signal when the traveling control signal is generated.

(C3) In each of the above-described embodiments, an internal sensor may be mounted on the vehicle 100, and a detection result output from the internal sensor may be used for at least one of the generation of the route and the generation of the traveling control signal. For example, the vehicle 100 may acquire the detection result of the internal sensor and reflect the detection result of the internal sensor to the route when the route is generated. The vehicle 100 may acquire the detection result of the internal sensor and reflect the detection result of the internal sensor to the traveling control signal when the traveling control signal is generated.

(C4) In the first embodiment, the server 200 automatically generates the traveling control signal to be transmitted to the vehicle 100. In contrast, the server 200 may generate the traveling control signal to be transmitted to the vehicle 100 in response to an operation of an external operator who is located outside the vehicle 100. For example, the external operator may operate an operation device including a display that displays the captured image output from the external sensor, a steering wheel, an accelerator pedal, and a brake pedal for remotely operating the vehicle 100, and a communication device that communicates with the server 200 via wired communication or wireless communication, and the server 200 may generate the traveling control signal in response to the operation applied to the operation device.

(C5) In each of the above-described embodiments, the vehicle 100 need solely have a configuration capable of moving by the unmanned driving, and may have a form of the platform having a configuration described below, for example. Specifically, the vehicle 100 need solely include at least a control device that controls the traveling of the vehicle 100 and an actuator of the vehicle 100 in order to exhibit three functions of "traveling", "turning", and "stopping" by the unmanned driving. In a case where the vehicle 100 acquires the information from the outside for the unmanned driving, the vehicle 100 need solely further include a communication device. That is, the vehicle 100 that can be moved the unmanned driving need not be equipped with at least a part of the interior components, such as a driver's seat and a dashboard, need not be equipped with at least a part of the exterior components, such as a bumper and a fender mirror, and need not be equipped with a bodyshell. In this case, the remaining components, such as the bodyshell, may be equipped on the vehicle 100 while the vehicle 100 is shipped from the factory, or the remaining components, such as the bodyshell, may be equipped on the vehicle 100 after the vehicle 100 is shipped from the factory in a state where the remaining components, such as the bodyshell, are not equipped on the vehicle 100. Each component may be equipped from any direction, such as an upper side, a lower side, a front side, a rear side, a right side, or a left side of the vehicle 100, and may be equipped from the same direction or different directions. The position decision can be made for the form of the platform in the same manner as the vehicle 100 in the first embodiment.

(C6) The vehicle 100 may be manufactured by combining a plurality of modules. The module means a unit configured by a plurality of components assembled depending on the part or the function of the vehicle 100. For example, the platforms of the vehicle 100 may be manufactured by combining a front module that constitutes a front portion of the platform, a center module that constitutes a center portion of the platform, and a rear module that constitutes a rear portion of the platform. In addition, the number of the modules constituting the platform is not limited to three, and may be two or less or four or more. In addition to or instead of the components constituting the platform, the components constituting a portion of the vehicle 100 that is different from the platform may be modularized. In addition, various modules may include any exterior component, such as a bumper or a grille, or any interior component, such as the seat or a console. In addition, in addition to the vehicle 100, a mobile body of any aspect may be manufactured by combining the modules. Such a module may be manufactured by joining the components via welding, a fastener, or the like, or may be manufactured by integrally molding at least a part of the components constituting the module as one component by casting. A molding method of integrally molding one component, particularly a relatively large component, is also called giga casting or mega casting. For example, the front module, the center module, and the rear module may be manufactured by using giga casting.

(C7) The transport of the vehicle 100 using the traveling of the vehicle 100 via the unmanned driving is also referred to as "autonomous transport". A configuration for implementing the autonomous transport is also referred to as "vehicle remote control autonomous driving transport system". A production method of producing the vehicle 100 by using the autonomous transport is also referred to as "autonomous production". In the autonomous production, for example, at the factory that manufactures the vehicle 100, at least a part of the transport of the vehicle 100 is implemented by the autonomous transport.

The present disclosure is not limited to the above-described embodiments, and can be implemented with various configurations without departing from the spirit of the present disclosure. For example, the technical features in the embodiments corresponding to the technical features in each form described in the section of SUMMARY can be replaced or combined as appropriate to solve some or all of the above objects, or to achieve some of or all the above effects. In a case where the technical features are not described as necessary features in the present specification, the features can be deleted as appropriate.

What is claimed is:

1. A control device that generates a control command for controlling a mobile body by using three-dimensional point cloud data of the mobile body measured by a distance measurement device, the control device comprising an estimation unit configured to, in a case where a defective portion is generated in the three-dimensional point cloud data acquired from the distance measurement device, execute matching between a substantial point cloud portion obtained by excluding a defect corresponding portion corresponding to the defective portion from a template point cloud and the three-dimensional point cloud data, to estimate at least one of a position and an orientation of the mobile body.

2. The control device according to claim 1, further comprising a template point cloud modification unit configured to delete the defect corresponding portion from the template point cloud, to create a modified template point cloud,
  wherein the estimation unit is configured to execute matching between the three-dimensional point cloud data and the modified template point cloud, to estimate at least one of the position and the orientation of the mobile body.

3. The control device according to claim 1, further comprising a defect specifying unit configured to specify the defective portion of the three-dimensional point cloud data.

4. The control device according to claim 3, wherein the defect specifying unit is configured to specify the defective portion of the three-dimensional point cloud data acquired from the distance measurement device, with reference to a history of the three-dimensional point cloud data.

5. The control device according to claim 3, wherein the defect specifying unit is configured to specify the defective portion depending on a distance between the mobile body and the distance measurement device by using a map in which the defective portion depending on the distance between the mobile body and the distance measurement device is registered.

* * * * *